Patented May 27, 1947

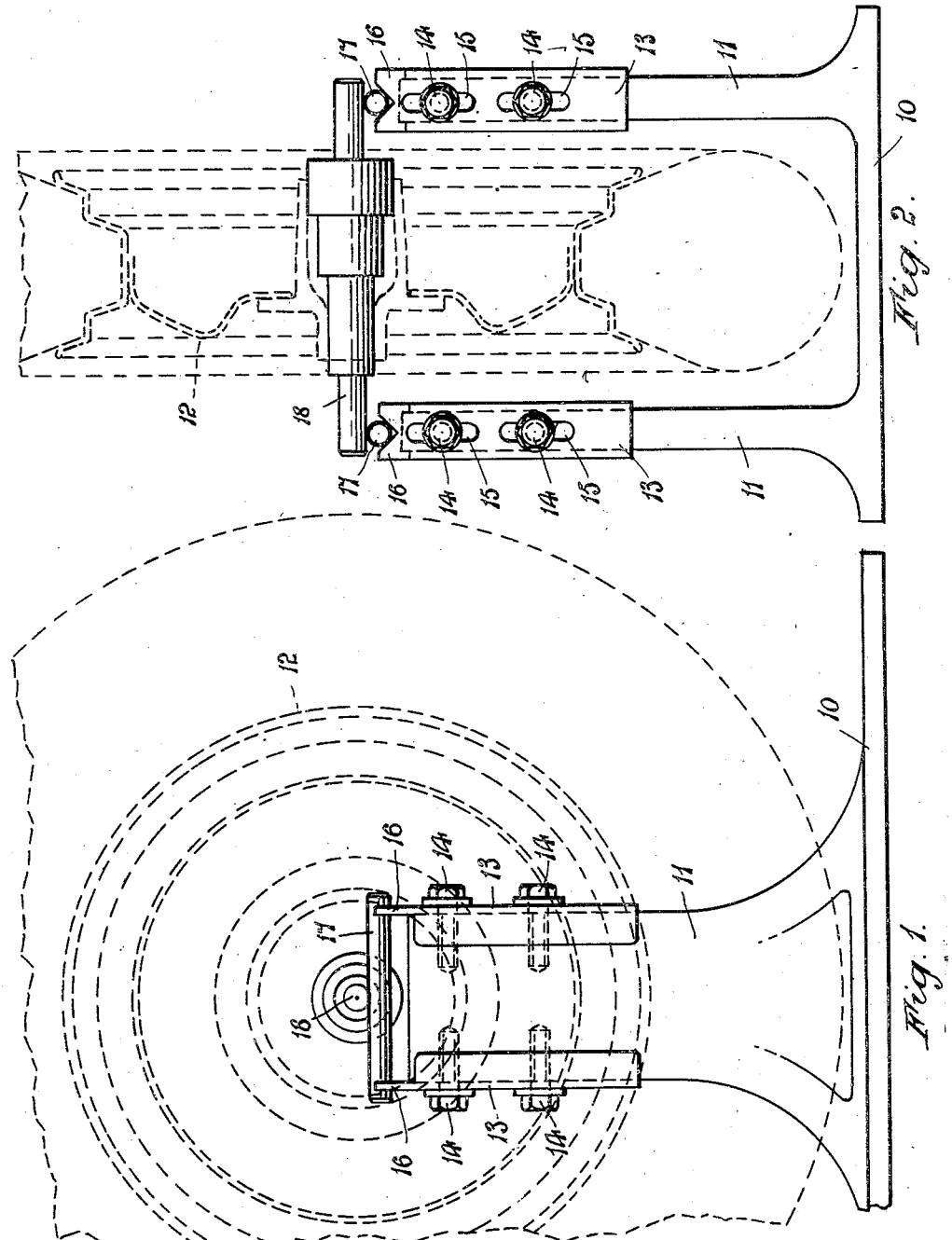

2,421,215

UNITED STATES PATENT OFFICE 2,421,215

AUTOMOBILE WHEEL BALANCER

Leo Olbrys, Hamtramck, Mich.

Application October 23, 1944, Serial No. 559,991

3 Claims. (Cl. 73—66)

This invention relates to means for the balancing of automobile wheels, as in service garages, and has for its object to provide a simple and readily adjustable and operable device in which such wheels may be tested for unbalance and the location of such unbalance quickly determined so that suitable counterweights may be applied to correct the condition, or so that material may be locally removed from the wheel if so desired for the same purpose.

Balancing devices as ordinarily constructed are too cumbersome and expensive for general use in garages, or call for an undue degree of skill on the part of the operator in using them, so that the balancing of automobile wheels is neglected to a very great extent, and the benefits of smoother and safer riding which may be experienced from properly balanced wheels is too often denied the user of an automobile. The necessity of such balancing is especially great, and its result appreciated, where tire repairs have been made such as patching, vulcanizing, recapping or the insertion of boots in the casing, all of which throw the wheel out of balance to an extent which very materially affects the smooth travel of the car on the road.

The present invention, therefore, has as an important object the provision of a simple stand or jack on which the cylindrical ends of a wheel arbor are supported by parallel low-friction rails, each provided with levelling adjustment, whereby when the said rails are properly levelled an automobile wheel slipped onto the said arbor will freely roll until its point of overbalance is directly below the arbor, whereupon suitable counterbalancing weights may then be attached in any desired manner to the then upper portion of the wheel.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction of arrangement of parts hereinafter described, by way of example, having reference to the accompanying drawing, wherein:

Figure 1, is a side elevation of a device embodying the said invention; and

Figure 2, is an end elevation of the same.

Similar characters of reference indicate similar parts in both figures of the drawing.

A stand is illustrated comprising a base 10 and spaced upright columns 11 between which columns an automobile wheel 12 may be freely accommodated. On the opposite vertical edges of each of the said columns 11 are slidably fitted U-shaped members 13, secured thereto by cap screws 14 passing through elongated slots 15 in the said members whereby the said members may be adjustable up and down on the said column, as by tapping with a hammer in the required direction, and thereafter secured in adjustment by simply tightening the said cap screws 14.

The said adjustable members 13 are provided at their upper ends with extensions 16 each having V notches therein to receive and support the ends of rails 17 preferably in the form of round polished rods. These rails are intended to be parallel with each other and, by the adjustment of the supporting members 13 in the manner described, may be readily levelled with the aid of spirit level applied to the said rails.

18 is an arbor suitably stepped or formed to enter the hub or bearings, as the case may be, of a wheel to be tested, and having cylindrical end portions resting on the two rails 17. It will be obvious that, if these rails are properly levelled, a wheel mounted on the said arbor will roll therewith along the rails until the unbalanced portion, if any, of the wheel comes to rest directly beneath the said arbor. When this unbalanced portion is so determined the wheel may be balanced by simply applying the necessary weights in any convenient manner to the opposite portion of the wheel and to the extent required. If the wheel is not out of balance it should remain in any position in which it is placed on the rails as will be well understood.

By utilizing round polished rods as the rails 17 and providing smooth cylindrical ends on the arbor a minimum of frictional resistance to the balancing operation will be experienced. The device described has the advantages of both simplicity and effectiveness and is capable of use by practically any one of ordinary intelligence without any special skill in the art of balancing, the proper pre-levelling of the said rails 17 being the simple precaution to be observed.

This invention may be developed within the scope of the following claims without departing from the essential features of the said invention, and it is desired that the specification and drawing be read as being merely illustrative of a practical embodiment of the said invention and not in a strictly limiting sense.

What I claim is:

1. In a device of the class described, a pair of spaced columns, vertically adjustable members having V-notches in their upper edges affixed to the vertical edges of said spaced columns, a pair of horizontal cylindrical rails arranged in parallel relation with their ends supported in the notches of said members, and a wheel arbor spanning and having rolling contact on said rails.

2. In a device of the class described, a base, a pair of uprights secured to the base in spaced apart relation, a pair of members having V-notches in their upper edges adjustably connected to the vertical edges of each of said uprights with their upper ends projecting above the upper edges of said uprights, a pair of cylindrical parallel rails each arranged to span the members of one upright with its ends received in the notches of said members of one upright, and a wheel supporting arbor spanning the said rails.

3. In a device of the class described, a base, a pair of uprights arranged on said base in spaced apart relation, a pair of members having V-notches in their upper edges for each upright disposed one at each vertical edge thereof adjacent the top of said upright, means for adjustably connecting said members to the vertical edges of said uprights to permit independent adjustment thereof, a cylindrical rail supported by and spanning each pair of members with the ends thereof resting in the notches of said members, flanges formed on the members engaging the side walls of said uprights to guide said members during adjustment and a wheel supporting arbor extending transversely of said rails with its ends resting on and having rolling contact therewith.

LEO OLBRYS.

REFERENCES CITED

The following references are of record in the file of this patent:

UNITED STATES PATENTS

| Number | Name | Date |
|---|---|---|
| 251,439 | Hetherington | Dec. 27, 1881 |
| 255,434 | Knight | Mar. 28, 1882 |
| 407,589 | Griffin | July 23, 1889 |
| 433,643 | Bowsher | Aug. 5, 1890 |

FOREIGN PATENTS

| Number | Country | Date |
|---|---|---|
| 264,005 | Great Britain | Jan. 13, 1927 |